(12) United States Patent
Anderson et al.

(10) Patent No.: US 7,501,007 B2
(45) Date of Patent: Mar. 10, 2009

(54) SEPARATION SYSTEM OF METAL POWDER FROM SLURRY AND PROCESS

(75) Inventors: Richard P. Anderson, Clarendon Hills, IL (US); Lance Jacobsen, Minooka, IL (US)

(73) Assignee: Cristal US, Inc., Hunt Valley, MD (US)

( * ) Notice: Subject to any disclaimer, the term of this patent is extended or adjusted under 35 U.S.C. 154(b) by 428 days.

(21) Appl. No.: 10/535,618

(22) PCT Filed: Sep. 3, 2003

(86) PCT No.: PCT/US03/27649

§ 371 (c)(1),
(2), (4) Date: Nov. 3, 2005

(87) PCT Pub. No.: WO2004/048622

PCT Pub. Date: Jun. 10, 2004

(65) Prior Publication Data

US 2006/0086435 A1 Apr. 27, 2006

(51) Int. Cl.
*B22F 9/00* (2006.01)

(52) U.S. Cl. .............................. 75/332; 75/367; 75/407

(58) Field of Classification Search ..................... None
See application file for complete search history.

(56) References Cited

U.S. PATENT DOCUMENTS

| 5,779,761 | A | 7/1998 | Armstrong et al. |
| 5,958,106 | A | 9/1999 | Armstrong et al. |
| 5,993,512 | A * | 11/1999 | Pargeter et al. ............... 75/416 |
| 6,409,797 | B2 | 6/2002 | Armstrong et al. |

* cited by examiner

*Primary Examiner*—George Wyszomierski
(74) *Attorney, Agent, or Firm*—Dunlap Codding, P.C.

(57) ABSTRACT

A system and method of separating metal powder from a slurry of liquid metal and metal powder and salt is disclosed in which the slurry is introduced into a first vessel operated in an inert environment when liquid metal is separated from the metal powder and salt leaving principally salt and metal powder substantially free of liquid metal. The salt and metal powder is transferred to a second vessel operated in an inert environment with both environments being protected from contamination. Then the salt and metal powder are treated to produce passivated powder substantially free of salt and liquid metal. The method is particularly applicable for use in the production of Ti and its alloys.

11 Claims, 1 Drawing Sheet

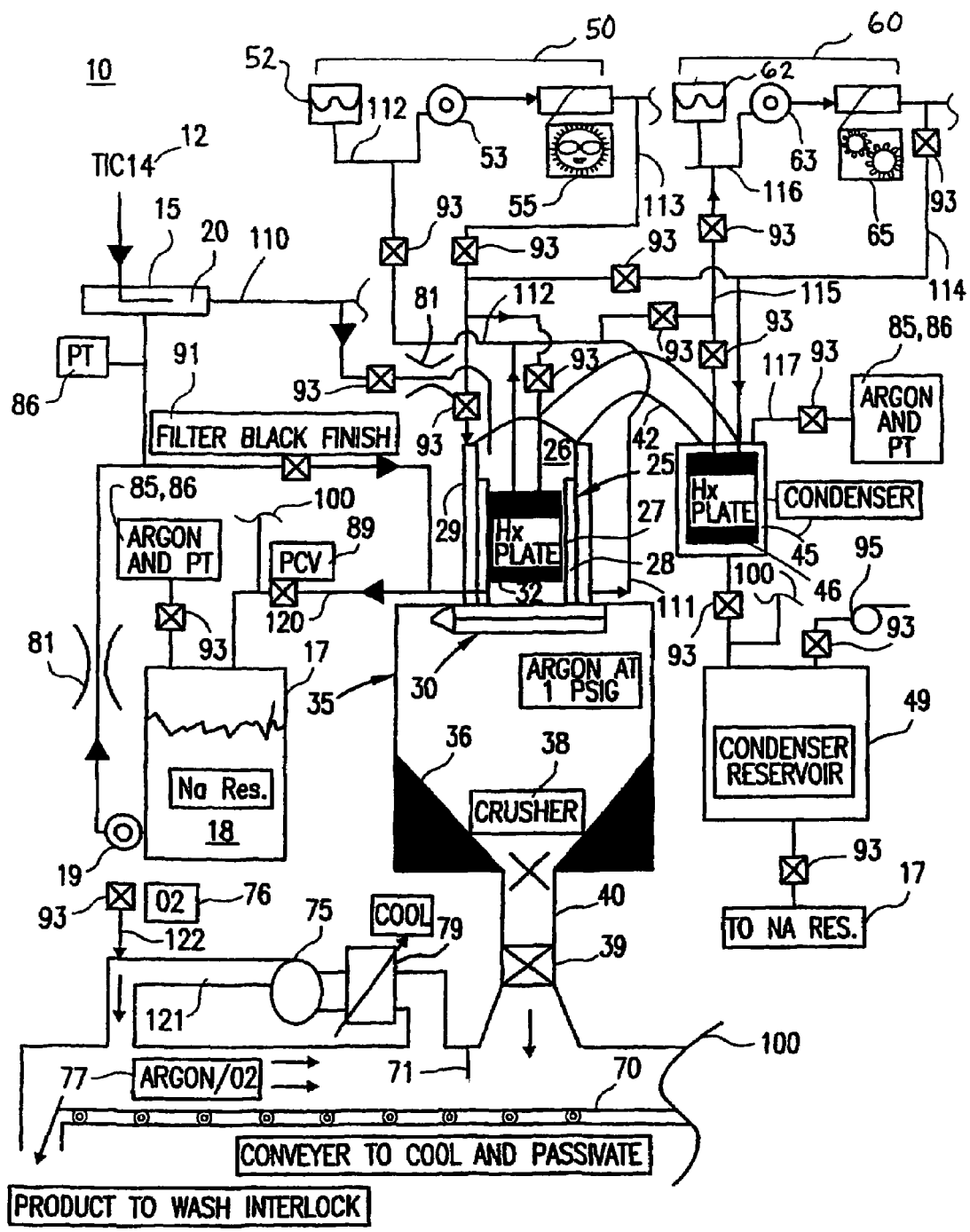

SEPARATION SYSTEM OF METAL POWDER FROM SLURRY AND PROCESS

BACKGROUND OF THE INVENTION

This invention relates to a separation system and process as illustrated in FIG. 1 useful for the product produced by Armstrong method as disclosed and claimed in U.S. Pat. Nos. 5,779,761; 5,958,106 and 6,409,797, the disclosures of each and every one of the above-captioned patents are incorporated by reference.

SUMMARY OF THE INVENTION

A principal object of the invention is to provide a separation system for the Armstrong process disclosed in the '761, '106 and '797 patents;

Another object of the invention is to provide a continuous separation system.

The invention consists of certain novel features and a combination of parts hereinafter fully described, illustrated in the accompanying drawings, it being understood that various changes in the details may be made without departing from the spirit, or sacrificing any of the advantages of the present invention.

BRIEF DESCRIPTION OF THE DRAWINGS

FIG. 1 is a schematic illustration of the separation system of the present invention.

DETAILED DESCRIPTION OF THE INVENTION

The system 10 of the present invention deals with the separation of a metal, alloy or ceramic product, such as titanium, for example only, from the reaction products in the Armstrong process. Although the Armstrong process is applicable to a wide variety of exothermic reactions, it is principally applicable to metals, mixtures, alloys and ceramics disclosed in the above-mentioned patents. The product of Armstrong process is a slurry of excess reductant metal, product metal and alloy or ceramic and salt produced from the reaction. This slurry has to be separated so that various parts of it can be recycled and the produced metal, alloy or ceramic separated and passivated if necessary.

Turning now to the schematic illustration of the system and process of the present invention illustrated in FIG. 1, there is disclosed in the system 10 a source of, for illustration purposes only, titanium tetrachloride 12 which is introduced into a reactor 15 of the type hereinbefore disclosed in the Armstrong process. A supply tank or reservoir 17 with a supply of sodium (or other reductant) 18 is transferred by a pump 19 to the reactor 15 wherein a slurry product 20 of excess reductant and metal, alloy or ceramic, and salt is produced at an elevated temperature, all as previously described in the incorporated patents.

The slurry product 20 is transferred to a vessel 25 which is in the illustration dome-shaped, but not necessarily of that configuration, the vessel 25 having an interior 26 into which the slurry product 20 is introduced. A filter 27, preferably but not necessarily cylindrical, is positioned within the interior 26 and defines an annulus 28, the slurry product 20 being received inside the cylindrical filter 27. An annular heat exchanger 29 is positioned around the vessel 25, all for a purpose hereinafter disclosed.

The vessel 25 further includes a moveable bottom closure 30. Heat exchange plates 32 are connected as will hereinafter be described to an isolated heating system 50. A collection vessel 35 is positioned below the vessel 25 and is sealed therefrom by the moveable bottom closure 30. The collection vessel 35 has an inwardly sloping bottom surface 36 which leads to a crusher 38 and a valve 39 in the outlet 40 of the collection vessel 35.

Finally, a vapor conduit 42 interconnects the top of the vessel 25 and particularly the interior 26 thereof with a condenser vessel 45, the condenser vessel having a heat exchange plate 46 connected, as hereinafter described, to an isolated cooling system 60. The condenser 45 is connected to a condenser reservoir 49, the condensate collected therein being routed to the sodium supply tank or reservoir 17.

The isolated heating system 50 includes a head tank 52 for the heating fluid which is moved by pump 53 to the heater 55 as will be hereinafter described, connected to both the heat exchanger 29 surrounding the vessel 25 and the heat exchange plates 32 interior of the vessel 25. The isolating cooling system 60 also is provided with a head tank 62, a pump 63 and a cooler 65 which serves to cool the cooling fluid circulated in an isolated loop to the cooling plates 46 as will be hereinafter set forth.

Below the valve 39 and the collection vessel 35 is a product conveyor 70 having a baffle or cake spreader 71 extending downwardly toward the conveyor 70. The conveyor 70 onto which the produced metal, alloy or ceramic and salt are introduced from the collection vessel 35, after removal of the excess reductant metal, is contacted with a counter current flow of gas, preferably but not necessarily oxygen and argon, 77 from a blower 75 in communication with a supply 76 of oxygen and the supply of inert gas such as argon. The heat exchanger 79 is in communication with the blower 75 so as to cool the oxygen/argon mixture 77 as it flows in counter current relationship with the produced metal, alloy or ceramic on the conveyor 70, thereby to contact the product particulates with oxygen to inertthe produced metal, alloy or ceramic when required but not so much as to contaminate the produced material.

As indicated in the flow sheet of FIG. 1, there are a plurality of flow meters 81 distributed throughout the system, as required and as well known in the engineering art. There are pressure transducers 86 and pressure control valves 89 where required, all within the engineering skill of the art. A back filter valve 91 is provided in order to flush the filter 27 if necessary. Additionally, a variety of standard shut-off valves 93 are positioned within the loop, hereinafter to be explained and as required. A vacuum pump 95 is used to draw a vacuum in the vessel 25, as will be explained, and the symbol indicated by reference numeral 100 indicates that a plurality of the same or similar systems may be operating at any one time, it being remembered that the enclosed figure is for a single reactor 15 and one separation vessel 25, wherein as in a commercial production plant, a plurality of reactors 15 may be operating simultaneously each reactor 15 may have more than one separation vessel 25, all depending on engineering economics and ordinary scale up issues.

Product 20 from the reactor 15 exits through line 110 and enters vessel 25 at the top thereof. Although line 110 is shown entering above the filter 27, preferably the line 110 and filter 27 are positioned so that slurry 20 is introduced below the top of filter 27 or in the center of the filter or both. As described in the previously incorporated patents, the slurry product 20 consists of excess reductant metal, salt formed by the reaction and the product of the reaction which in this specific example is titanium existing as solid particles. The product 20 in slurry form from the reactor 15 is at an elevated temperature depending on the amount of excess reductant metal present, the heat capacity thereof and other factors in the reactor 15 during operation of the Armstrong process. In the vessel 25 is a filter 27 which occupies a portion of the interior 26 of the vessel 25, the interior optionally being heated with the annular heat exchanger 29. The slurry product 20 is directed to the interior of the filter 27 where the slurry contacts the heat exchange plates 32.

In the heating system 50, the heat exchange fluid in the plates 32 pass with the heat exchange fluid from the annular heat exchanger 29 through line 111 to the line 112 which connects the heat exchange medium supply in the head tank 52 to the heat exchanger 55. Fluid moves from the heater 55 through the heat exchange plates 32 by means of the pump 53 as the heated heat exchange fluid flows out of the heat exchanger 55 through line 113 and back into the heat exchange plates 32 and/or the annular heat exchanger 29. Because the heating system 50 is a closed loop, the heat exchange fluid may or may not be the same as the reductant metal used in the reactor 15. NaK is shown as an example because of the low melting point thereof, but any other suitable heat exchange fluid may be used. Suitable valves 93 control the flow of heat exchange fluid from the heater 55 to either or both of the heat exchanger 29 and plates 32. Preferably, the plates 32 are relatively close together, on the order of a few inches, to provide more heat to the cake which forms as excess reductant metal vaporizes. Moreover, closer plates 32 reduce the path length the heat has to travel and the path length the excess reductant metal vapor travels through the forming cake, thereby to reduce the time required to distill and remove excess reductant metal from the vessel 25. Exact spacing of the plates 32 depends on a number of factors, including but not limited to, the total surface area of the plates, the heat transfer coefficient of the plates, the amount of reductant metal to be vaporized and the temperature differential between the inside and the outside of the plates.

When the slurry product 20 comes out of the reactor 15, it is at a pressure at which the reactor 15 is operated, usually up to about two atmospheres. The product slurry 20 enters the inside of filter 27 under elevated pressure and gravity results in the liquid reductant metal being expressed through the filter 27 into the annular space 28 and fed by the line 120 into the reservoir 17. The driving force for this portion of the separation is gravity and the pressure differential between the reactor 15 and the inlet pressure of pump 19. If required the annulus 28 may be operated under vacuum to assist removal of liquid reductant metal, or the pressure in vessel 25 may be increased during the deliquoring of the reductant metal. After sufficient liquid metal has drained through the filter 27 by the aforementioned process, the PCV valve 89 is closed and other valves 93 are closed to isolate vessel 25 and then the valve 93 to the vacuum pump 95 is opened, whereupon a vacuum is established in the interior 26 of vessel 25. Heating fluid (liquid or vapor, for instance Na vapor) is directed into the heat exchanger plates 32 to boil the remaining reductant metal 18 producing a filter cake. The temperature in vessel 25 is elevated sufficiently to vaporize remaining liquid metal reductant 18 therein which is drawn off through conduit 42 to the condenser 45. The conduit 42 is required to be relatively large in diameter to permit rapid evacuation of the interior 26 of the vessel 25. Because the pressure drop between the vessel 25 and the condenser 45, during vaporization of the reductant metal 18 is low, the specific volume is high and the mass transfer low, requiring a large diameter conduit 42. Boiling the reductant metal on the shell side is accomplished by heat exchange with a heated fluid on the tube side.

The annular heat exchanger 29 is optionally operated to maintain the expressed liquid in the annulus 28 at a sufficient temperature to flow easily and/or to provide additional heat to the vessel 25 to assist in vaporization of excess reductant metal from the interior 26 thereof. After liquid metal reductant vapor has been removed from the interior 26 of the vessel 25, a filter cake remains from the slurry 20. The appropriate valves 93 are closed and the vacuum pump 95 is isolated from the system.

In the condenser 45, heat exchange plates 46 are positioned in order to cool the reductant metal vapor introduced thereinto. The cooling system 60 is operated in a closed loop and maintained at a temperature sufficiently low that reductant metal vapor introduced into the condenser 45 condenses and flows out of the condenser, as will be disclosed. The cooling system 60 includes a cooler 65 as previously described and the pump 62. The coolant exits from the cooler 65 through line 114 which enters the heat exchange plates 46 and leaves through a line 115 which joins the line 116 to interconnect the head tank 62 and the cooler 65. As seen in the schematic of FIG. 1, the heat exchange fluid used in the heating system 50 and the cooling system 60 may be the same or may be different, as the systems 50 and 60 can be maintained separately or intermixed.

Both the vessel 25 and the condenser 45 are operated at least part of the time under a protective atmosphere of argon or other suitable inert gas from the argon supply 85, the pressure of which is monitored by the transducer 86, the (argon) supply inert gas 85 being connected to the condenser 45 by a line 117, the condenser 45 also being in communication with the vessel 25 by means of the oversized conduit 42. Further, as may be seen, each of the heating system 50 and the cooling system 60 is provided with its own pump, respectively 53 and 63. As suggested in the schematic of FIG. 1, the heating and cooling fluid may, preferably be NaK due to its lower melting point, but not necessarily, and as an alternative could be the same as the reductant metal in either liquid or vapor phase, as disclosed.

After sufficient reductant metal 18 has been removed from the slurry 20, via the filter 27 and the conduit 42, remaining therein is a combination of the titanium product in powder form and salt made during the exothermic reaction in reactor 15. Because the resultant dried cake has a smaller volume than the slurry product 20 introduced, when the movable bottom closure 30 is opened, the dry cake falls from the filter 27 into the collection vessel 35 whereupon the combination of salt and titanium fall into the crusher 38 due to the sloped bottom walls 36. In the event the cake does not readily fall of its own accord, various standard vibration inducing mechanism or a cake breaking mechanism may be used to assist transfer of the cake to the collection vessel 35. The collection vessel 35 as indicated is maintained under an inert atmosphere at about atmospheric pressure, and after the cake passes through the crusher 38 into the exit or outlet 40, the cake passes downwardly through valve 39 onto the conveyor 70. There is a cake spreader or baffle 71 downstream of the valve 39 which spreads the cake so that as it is contacted by a mixture 77 of inert gas, preferably argon, and oxygen flowing counter-current to the direction of the product, the titanium powder is passivated and cooled. Although the conveyor 70 is positioned in FIG. 1 horizontally, it may be advantageous to have the conveyor move upwardly at a slant as a safety measure in the event that closure 30 fails, then excess reductant metal would not flow toward a water wash. In addition, there may be cost advantages in having the product wash equipment on the same level as the separation equipment.

Cooling and passivating is accomplished in the cooler 79 with blower 75 which blows a cooled argon and oxygen mixture through a conduit 121 to the product, it being seen from the schematic that the counter-current flow of argon and oxygen with the product has the highest concentration of oxygen encountering already passivated and cooled titanium so as to minimize the amount of oxygen used in the passivation process. Oxygen is conducted to the system from a supply thereof 76 through a valve 93 and line 122 and is generally maintained at a concentration of about 0.1 to about 3% by weight. The mixture of passivated titanium and salt is thereafter fed to a wash system not shown. Various flow meters 81 are positioned throughout the system as required, as are pressure control valves 89 and pressure transducers 86. A filter backwash valve 91 is positioned so that the filter 27 can be backwashed when required if it becomes clogged or otherwise requires backwashing. Standard engineering items such as valves 93, vacuum pump 95 and pressure transducers 86 are situated as required. Symbol 100 is used to denote that parallel systems identical or similar to all or a portion of the system 10 illustrated may be operated simultaneously or in sequence.

In the Armstrong process, the production of the metal, alloy or ceramic is continuous as long as the reactants are fed to the reactor. The present invention provides a separation system, apparatus and method which permits the separation to be either continuous or in sequential batches so rapidly switched by appropriate valving as to be as continuous as required. The object of the invention is to provide a separation apparatus, system and method which allows the reactor(s) 15 in a commercial plant to operate continuously or in economic batches. Reduction of the distillation time in vessel 25 is important in order to operate a plant economically, and economics dictate the exact size, number and configuration of separation systems and production systems employed. Although described with respect to Ti powder, the invention applies to the separation of any metal, alloy thereof or ceramic produced by the Armstrong process or other industrial processes.

The heating mechanism shown is by fluid heat exchange, but heaters could also be electric or other equivalent means, all of which are incorporated herein. The bottom closure 30 is shown as hinged and is available commercially. The closure 30 may be clamped when shut and hydraulically moved to the open position; however, sliding closures such as gate valves are available and incorporated herein. Although the reactor 20 is shown separate from the vessel 25, the invention includes engineering changes within the skill of the art, such as but not limited to incorporating reactor 20 into vessel 25. Although vessel 35 is illustrated in one embodiment, the vessel 35 could easily be designed as a pipe. Also, the crusher 38 could be located in vessel 25 or intermediate vessel 25 and vessel 35. Moreover, the cake forming on the filter 27 may be broken up prior to or during or subsequent to removal of the liquid metal therefrom. Similarly, when referring to an inert environment, the invention includes a vacuum as well as an inert gas. An important feature of the invention is the separation of vessels 25 and 35 so the environments of each remain separate. That way, no oxygen can contaminate either vessel.

In one specific example, a reactor 15 producing 2 million pounds per year of titanium powder or alloy powder requires two vessels 25, each roughly 14' high and 7' in diameter with appropriate valving, so that the reactor 15 would operate continuously and when one vessel 25 was filled, the slurry product from the reactor would switch automatically to the second vessel 25. The fill time for each vessel 25 is the same or somewhat longer than the deliquor, distill and evacuation time for vessel 25.

Changing production rates of reactor 15 simply requires engineering calculations for the size and number of vessels 25 and the related equipment and separation systems. The invention as disclosed permits continuous production and separation of metal or ceramic powder, while the specific example disclosed permits continuous separation with two or at most three vessels 25 available for each reactor 15. With multiple reactors 15, the number of vessels 25 and related equipment would probably be between 2 and 3 times the number of reactors.

While there has been disclosed what is considered to be the preferred embodiment of the present intention, it is understood that various changes in the details may be made without departing from the spirit, or sacrificing any of the advantages of the present invention.

What is claimed is:

1. A method of separating metal powder from a slurry of liquid metal and metal powder and salt, comprising introducing the slurry into a first vessel operated in an inert and/or vacuum environment for separation of liquid metal from the metal powder and salt leaving principally salt and metal powder substantially free of liquid metal, transferring the salt and metal powder substantially free of liquid metal to a second vessel operated in an inert environment, and thereafter treating the salt and metal powder to produce passivated metal powder substantially free of salt and liquid metal, wherein the salt and metal powder are crushed to form clumps having diameters less than about five centimeters prior to passivation.

2. The method of claim 1, wherein passivation occurs on a conveyor.

3. The method of claim 2, wherein the metal powder is continuously cooled and passivated.

4. A method of separating metal powder from a slurry of liquid metal and metal powder and salt formed by introducing a metal halide vapor subsurface of a liquid metal causing an exothermic reaction producing salt and metal powder with the liquid metal being present in excess of the stoichiometric amount required, the method comprising introducing the slurry into a first vessel operated in an inert and/or vacuum environment for filtration and vaporization of liquid metal from the metal powder and salt leaving principally salt and metal powder substantially free of liquid metal, transferring the liquid metal vapor to a condenser operated in an inert environment to convert the liquid metal vapor to a liquid to be recycled for production of additional metal powder, transferring the salt and metal powder substantially free of liquid metal to a second vessel operated in an inert environment, and thereafter treating the salt and metal powder to produce passivated metal powder substantially free of salt and liquid metal.

5. The method of claim 4, wherein the slurry is heated in the first vessel by contact with a heat exchanger internal to the first vessel having heat exchange fluid pumped therethrough.

6. The method of claim 4, wherein the liquid metal vapor from the first vessel is cooled by contact with heat exchanger internal to the condenser having a heat exchange fluid pumped therethrough.

7. The method of claim 4, wherein the first vessel is heated by both an internal and an external heat exchanger.

8. The method of claim 4, wherein the slurry is introduced into the interior of a candle filter in the first vessel with liquid metal flowing through the candle filter and out of the first vessel.

9. The method of claim 4, wherein the inert environment for the first and second vessels is an argon atmosphere.

10. The method of claim 9, wherein the condenser is operated in an argon atmosphere.

11. The method of claim 4, wherein the environments of the first and second vessels are protected from contamination by oxygen during the production of metal powder substantially free of salt and liquid metal.

* * * * *